(12) United States Patent
Slaight

(10) Patent No.: US 7,457,969 B2
(45) Date of Patent: Nov. 25, 2008

(54) COMPUTER SYSTEM MONITORING

(75) Inventor: Thomas M. Slaight, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 651 days.

(21) Appl. No.: 11/040,729

(22) Filed: Jan. 21, 2005

(65) Prior Publication Data

US 2005/0125199 A1 Jun. 9, 2005

Related U.S. Application Data

(63) Continuation of application No. 10/222,717, filed on Aug. 15, 2002, now Pat. No. 6,882,963, which is a continuation of application No. 09/405,513, filed on Sep. 23, 1999, now Pat. No. 6,480,809.

(51) Int. Cl.
*G06F 15/00* (2006.01)
(52) U.S. Cl. .................. 713/200; 702/186; 702/57; 702/58; 702/62; 702/193; 702/185; 702/182
(58) Field of Classification Search ................ 713/200; 702/57, 58, 62, 182, 185, 186, 193, 132; 700/26, 28, 30, 31–33
See application file for complete search history.

(56) References Cited

U.S. PATENT DOCUMENTS

| | | | |
|---|---|---|---|
| 4,823,290 A * | 4/1989 | Fasack et al. ........... 340/825.01 |
| 5,293,323 A | 3/1994 | Doskocil et al. |
| 5,437,040 A | 7/1995 | Campbell et al. |
| 5,564,015 A | 10/1996 | Bunnell |
| 5,572,672 A * | 11/1996 | Dewitt et al. ................... 714/47 |
| 5,590,061 A | 12/1996 | Hollowell, II et al. |
| 5,602,749 A | 2/1997 | Vosburgh |
| 5,691,870 A | 11/1997 | Gebara |
| 5,726,911 A | 3/1998 | Canada et al. |
| 5,748,882 A * | 5/1998 | Huang ......................... 714/47 |
| 5,763,960 A | 6/1998 | Ceccherelli et al. |
| 5,867,809 A * | 2/1999 | Soga et al. .................. 702/130 |
| 5,926,777 A * | 7/1999 | Vink et al. .................. 702/130 |
| 6,112,164 A * | 8/2000 | Hobson ...................... 702/132 |
| 6,169,442 B1 * | 1/2001 | Meehan et al. .............. 327/513 |

* cited by examiner

*Primary Examiner*—Carol S Tsai
(74) *Attorney, Agent, or Firm*—Fish & Richardson P.C.

(57) ABSTRACT

A computer monitoring system includes a sensor, a non-volatile storage and a controller. The sensor measures a parameter of a computer, and the non-volatile storage holds a threshold representing a limit for the parameter. The controller is configured to determine a normal operating range for the parameter and modify the threshold to match the limit of the normal operating range more closely.

17 Claims, 1 Drawing Sheet

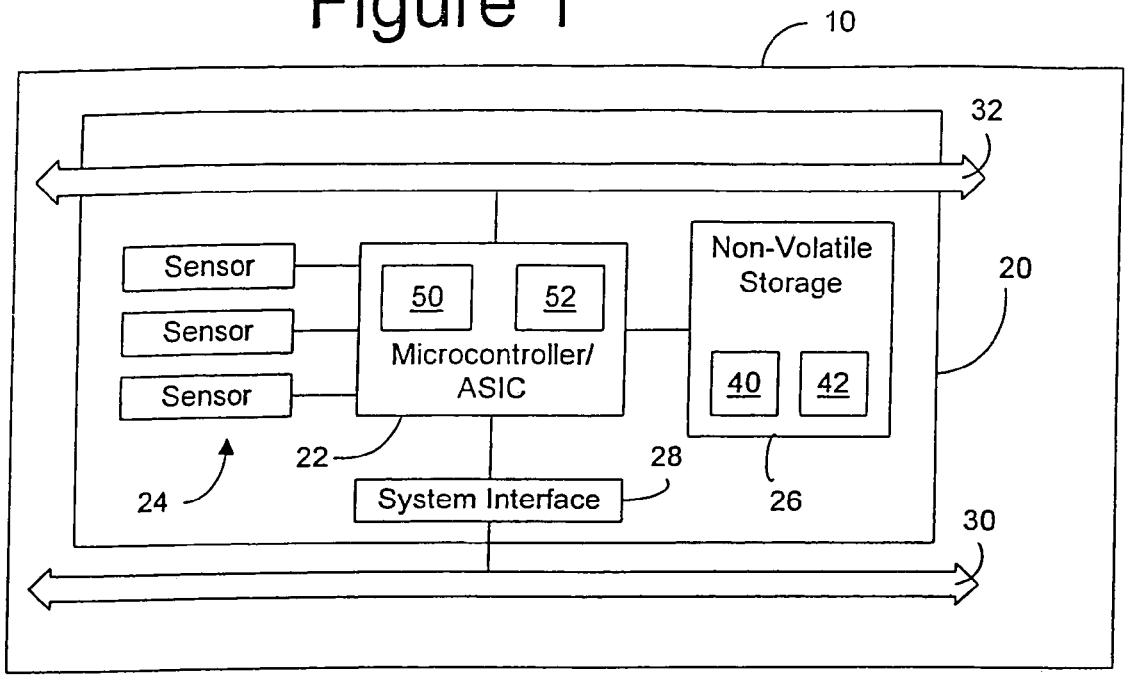
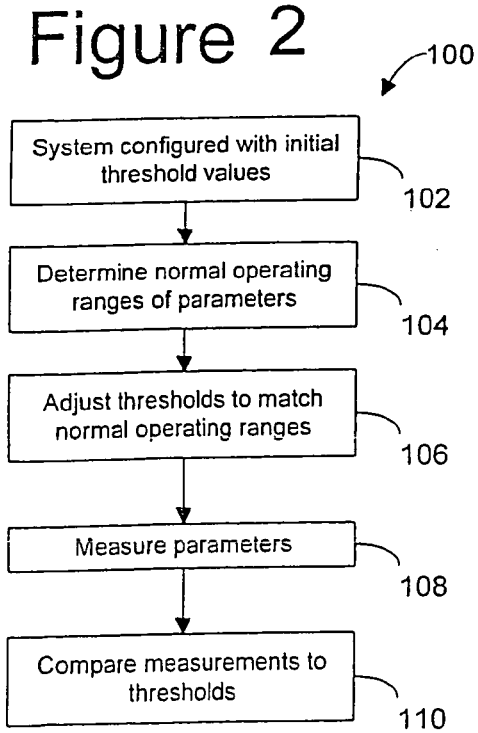
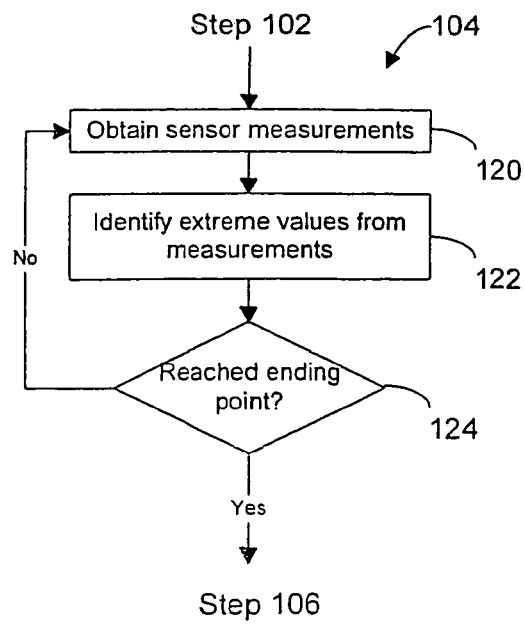

COMPUTER SYSTEM MONITORING

CROSS-REFERENCE TO RELATED APPLICATIONS

This application is a continuation application and claims the benefit under 35 USC 120 of application Ser. No. 10/222,717, filed Aug. 15, 2002 now U.S. Pat. No. 6,882,963, which is a continuation of application Ser. No. 09/405,513, filed Sep. 23, 1999 now U.S. Pat. No. 6,480,809.

BACKGROUND

The present invention relates to the monitoring of a computer system, and more particularly to the monitoring of a computer system by a platform management subsystem.

Some computer systems, particularly servers and high-end workstations, include a platform management subsystem that monitors the computer system and indicates when it is functioning outside a specified operating range. A conventional platform management subsystem includes a microcontroller that compares a sensor measurement to an associated threshold stored in a non-volatile storage. If the sensor measurement is outside the operating range defined by the threshold, this event is logged by the microcontroller in the non-volatile storage. The logged event can then be used by the platform management subsystem (or by other components of the computer system) to determine whether the computer system is operating abnormally so that corrective action can be taken. For example, a platform management subsystem might include a voltage sensor to monitor the output voltage of a power supply.

In a conventional platform management subsystem, the thresholds are set according to the manufacturer's specifications, plus an additional range to compensate for inaccuracies introduced by the monitoring circuitry and prevent false events. For example, a five-volt power supply is typically specified to have an output voltage of 5.0+/−5%. Assuming that the monitoring subsystem is set with an additional range of 3%, the thresholds would be set at 4.6 and 5.4 volts (5.0+/−8%). If the voltage exceeded the upper threshold of 5.4 volts, or fell below the lower threshold of 4.6 volts, the controller would generate an alert message indicating that the power supply is not operating properly.

Platform management subsystems are described by the following documents: *Intelligent Platform Management Interface Specification*, v1.0, Intel Corporation, Hewlett-Packard Company, NEC Corporation, and Dell Computer Corporation (Sep. 16, 1998); *Intelligent Platform Management Bus Communications Protocol Specification* v1.0, Intel Corporation, Hewlett-Packard Company, NEC Corporation, and Dell Computer Corporation (1998); *IPMB* v1.0 *Address Allocation*, Intel Corporation, Hewlett-Packard Company, NEC Corporation and Dell Computer Corporation (1998); *Platform Management FRU Information Storage Definition* v1.0, Intel Corporation, Hewlett-Packard Company, NEC Corporation, and Dell Computer Corporation (1998); *Intelligent Chassis Management Bus Bridge Specification* v0.9, Intel Corporation (1997); *System Management BIOS Specification, Version* 2.3, American Megatrends, Inc., Award Software International, Inc., Dell Computer Corporation, Intel Corporation, Phoenix Technologies Ltd., SystemSoft Corporation (1998); *The I²C Bus And How To Use It*, Philips Semiconductors (1995); and *Network PC System Design Guidelines, Version* 1.0b, Compaq Computer Corporation, Dell Computer Corporation, Hewlett Packard Company, Intel Corporation, and Microsoft Corporation (1997).

SUMMARY

In general, the invention is directed to a computer monitoring system. The computer monitoring system has a sensor, a non-volatile storage, and a controller. The sensor measures a parameter of a computer, and the non-volatile storage holds a threshold representing a limit for the parameter. The controller is configured to determine a normal operating range for the parameter and modify the threshold to match the limit of the normal operating range more closely.

Advantages of the invention may include one or more of the following. The platform management subsystem may be more sensitive to unusual behavior of the computer system, thereby providing more accurate failure prediction. The platform management subsystem can automatically adapt to the normal operating conditions of an individual computer system, without requiring calibration during production.

Other features and advantages of the invention will become apparent from the following description, including the drawings and the claims.

BRIEF DESCRIPTION OF DRAWINGS

FIG. 1 is a schematic block diagram of a platform management subsystem from a computer system.

FIG. 2 is a flowchart illustrating a method performed by the platform management subsystem.

FIG. 3 is a flowchart illustrating a method of determining the normal operating range of a parameter of a computer system.

DETAILED DESCRIPTION

FIG. 1 shows a computer system 10 that includes a platform management subsystem 20 to monitor the computer system 10 and determine if the computer system is functioning outside its normal operating range. To explain the advantages of the platform management subsystem 20, it should be noted that most computer systems function in a normal operating range that is significantly narrower than the tolerances set by the manufacturer's specifications. This normal operating range may vary between individual computer systems, and even between individual computer systems built to the same specifications by the same manufacturer. However, for an individual computer system, the normal operating range is typically fairly stable. For example, a voltage supply that is specified by the manufacturer to generate a nominal supply voltage of 5.0 volts with a tolerance of +/−5% may, under normal operating conditions, generate a voltage of 4.9 volts with a tolerance of +/−1%. Unlike prior platform management subsystems in which the thresholds are set based on the manufacturer's specifications, the platform management subsystem 20 can adjust the thresholds to reflect the actual normal operating range of the computer system 10 in which it is installed. In short, the platform management subsystem 20 autonomously adjusts itself to become sensitive to the normal operating range of the individual computer system 10.

The platform management subsystem 20 includes a microcontroller 22, such as a programmable microprocessor or application-specific integrated circuit (ASIC), one or more sensors 24, and a non-volatile storage 26, such as an erasable programmable read only memory (EPROM), hard disk drive, or battery-backed random access memory (RAM). The non-volatile storage can be shared with or implemented as part of the other components in the computer system 10, such as the computer system's basic input/output system flash-programmable read-only memory (BIOS FLASH PROM). The microcontroller 22 is connected by a subsystem interface 28 to a system bus 30 in the computer system 10. The platform management subsystem 20 may also include a platform management bus 32 to send and receive messages to and from other management subsystems, such as a chassis management subsystem. Although illustrated as a single component, the monitoring subsystem could be distributed, and its components could communicate through the platform management bus 32. In addition, devices external to the computer system 10 can be used to extend or access the platform management system's capabilities.

The sensors 24 can monitor a variety of "physical" parameters of the computer system, i.e., parameters relating to the physical functioning of the computer system. These physical parameters can include environmental parameters (e.g., the temperature of the computer motherboard, or the temperature and humidity in the computer system chassis), mechanical parameters (e.g., the fan speed), and electrical parameters (e.g., the output voltage and output current from the voltage supply). Typically there will be one sensor for each monitored parameter, although a single sensor could measure more than one parameter, and the readings from several sensors could be combined when monitoring a parameter.

The platform management subsystem 20 can maintain a sensor configuration storage 40 and an optional system event log 42 in the non-volatile storage 26. The sensor configuration storage 40 also contains at least one threshold for each parameter measured by the sensors. The thresholds define the limits of the parameter during normal operation of the computer system. The sensor configuration storage 40 may also describe the location, type of measurement (temperature, voltage, etc.), and unit of measurement (degrees Fahrenheit, volts, etc.) of each sensor 24. The identity of the register with the appropriate sensor measurement can be hard-coded into an ASIC, stored in system BIOS, or implemented in software.

If the parameter has an operating range with an upper limit and a lower limit, then the sensory configuration storage 40 will include an upper threshold and a lower threshold to define the range. If the parameter has simply a maximum or minimum value, then the sensory configuration storage 40 need include only a lower or upper threshold, respectively. The sensory configuration storage 40 can also include other information relating to the sensor, such as an identification number.

Assuming the monitoring subsystem 20 maintains a system event log 42, this log can describe each "event" recorded by the microcontroller 22, e.g., each time that one of the monitored parameters exceeds or falls below its associated threshold. The system event log 42 identifies the sensor associated with the event, the time of the event, and the type of event (e.g., whether the sensor reading exceeded or fell below the associated threshold).

The microcontroller 22 provides the intelligence for the platform management subsystem 20. In general, the microcontroller performs automatic baselining, a threshold adjustment procedure, and an autonomous monitoring procedure. In the automatic baselining procedure, the microcontroller 22 determines the normal operating ranges for the parameters monitored by the sensors 24. In the threshold adjustment procedure, the thresholds are tightened to increase the platform monitoring system's sensitivity. In the autonomous monitoring procedure, the microcontroller monitors the performance of the computer system 10 by periodically comparing the sensor readings from the sensors 24 to the threshold values in the non-volatile storage 26. The microcontroller can include a first agent 50 that performs the automatic baselining and threshold adjustment procedure, and a second agent 52 that performs the autonomous monitoring procedure. The microcontroller 22 may also receive and log event messages from the platform management bus 32. In addition, the microcontroller may also include a system timer to log the time of any event. The microcontroller may be implemented in hardware, firmware, software, or combinations thereof, including ASIC and discrete logic devices.

FIGS. 2 and 3 show a computer system monitoring method 100 performed by the platform management subsystem 20. The method begins when a set of initial thresholds associated with the specified operating ranges of the monitored parameters are stored in the non-volatile storage at step 102. Once the computer is started, the microcontroller 22 performs an automatic baselining (i.e., creating a baseline) step that determines the normal operating ranges for the parameters at step 104. Then the thresholds are adjusted so that they more closely match the normal operating ranges of the parameters at step 106. Once the microcontroller 22 has performed its automatic baselining and threshold adjustment, a normal monitoring mode is established in which the parameters are autonomously measured at step 108. Alternately, the system monitoring can occur concurrently with the automatic baselining and threshold adjustment step. The measurements are compared to the thresholds at step 110 to determine whether the computer system is functioning normally. Each of these steps will be discussed in greater detail below.

As noted above, the initial thresholds are stored in the non-volatile storage in step 102. These initial thresholds are set during manufacturing or the platform monitoring subsystem 20, or during integration of the platform monitoring system 20 into the computer system 10. For example, a vendor may be given tools to set the initial thresholds depending on what components are installed in the computer chassis.

The initial thresholds may represent the manufacturer's specifications, with some margin for resolution, tolerance and accuracy of the platform monitoring system. All similar computer systems from the same manufacturer should meet the manufacturing specifications. Hence, any individual computer systems should operate within the range that is specified by the initial thresholds.

At the initial start-up, the initial thresholds may be loaded into the monitoring system from a non-volatile storage outside the monitoring system, e.g., from the BIOS flash PROM. In steps 104 and 106, the platform management subsystem tightens the thresholds to more closely match the actual normal operating range of the individual computer system 10. For each parameter, the microcontroller 22 periodically obtains measurements from the associated sensor 24 at step 120 and searches for the 'extreme' values, i.e., the highest and lowest values, that occur in the measurements at step 122. These extreme values may be stored in volatile or non-volatile storage. The extreme values are accumulated until some preset ending point at step 124. For example, the microcontroller 22 may monitor the measurements from the sensor 24 for a fixed interval, as measured by the internal timer or by a system clock. The microcontroller 22 can use the maximum and minimum values measured during that interval as the new thresholds. Alternately, the timer or clock can be restarted each time the microcontroller 22 detects a new maximum or minimum measurement value. In this case, the microcontroller 22 will continue monitoring the sensor 24 until the maximum and minimum measurements have remained unchanged for a predefined interval.

Once the extreme values are accumulated, the controller adjusts the thresholds in step 106. The new thresholds are stored in non-volatile storage for later use. The new thresholds may be stored directly by the platform management subsystem, or the thresholds may be stored by computer system, e.g., in the system BIOS. This might or might not be the same non-volatile storage used to store the initial thresholds. The new threshold may overwrite the initial thresholds, or the initial thresholds can be saved.

In general, the upper threshold is set to the maximum value determined in step 104, and the lower thresholds is set to minimum value determined in step 104. However, a correction factor for the resolution and tolerance of the platform monitoring system sensor, plus a general margin to compensate for transient changes, can be applied to either threshold so as to avoid false events. Resolution indicates the smallest discrete change detectable by the sensor, and tolerance indicates a potential constant offset in the sensor measurement.

The range between the minimum and maximum values during normal operation is typically significantly smaller than the range required by the manufacturer's specification. Therefore, the threshold range is tightened so that it more exactly matches the normal operating range of the individual computer system 10. Consequently, the platform monitoring subsystem 20 becomes more sensitive, and the event messages more accurately predict system abnormalities.

For example, assume that a voltage supply that is specified by the manufacturer to generate a nominal supply voltage of 5.0 +/−5% volts, and the sensor has a resolution of 0.01 volts, a tolerance of 0.02 volts, and an accuracy of +/−3%, and the manufacture desires an additional margin of error of 0.05 volts.

The initial upper and lower thresholds stored in the non-volatile memory might be 5.48 and 4.53 volts, respectively. The upper threshold can be calculated by multiplying the specified operating range (5.0*1.05=5.25) by the accuracy of the sensor (5.25*1.03=5.4075), rounding to the resolution (5.41), and adding the tolerance (5.41+0.02=5.43) and margin (5.43+0.05=5.48). The lower initial threshold can be calculated similarly.

If the voltage supply actually generates a voltage of 4.9 volts with an operating range of +/−1% under normal operating conditions, then the controller should detect extreme values of 4.95 and 4.85 volts when determining the normal operating range of the supply voltage in step 104. In the adjustment step 106, the upper and lower thresholds could be changed to values close to 4.95 and 4.85 volts, respectively. Specifically, the same margin used in determining the initial thresholds may be added or subtracted from the extreme values to calculate the new thresholds. In the example, this would provide new upper and lower thresholds of 5.00 and 4.80 volts, respectively. As compared to the initial thresholds of 5.48 and 4.53 volts, the autobaselining step has resulted in a 480 mV decrease in the upper threshold and a 270 mV increase in the lower threshold. Thus, the thresholds are tightened to more closely match the actual normal operating range of the supply voltage in that individual computer system.

Of course, many other procedures may be used to determine the new thresholds. For example, the microcontroller 22 may monitor the sensor 24 for a preset interval, compute the average value and standard deviation of the measurements taken during the preset interval, and then set the thresholds based on the average value and standard deviation. Alternatively, the microcontroller 22 may monitor the sensor 24 and compute the average value of a parameter, and then calculate the thresholds for the parameter by adding and subtracting a predetermined variance from the average value.

If the baselining and system monitoring steps are conducted concurrently, then the platform management system 20 can use the default thresholds until the baseline thresholds are available. Alternately, the thresholds can be adjusted incrementally as the baselining step progresses.

If the minimum or maximum values measured during step 104 are outside the range specified by the initial thresholds, this indicates that the computer system is not operating normally. In this case, the platform monitoring subsystem 20 uses the initial thresholds to trigger an event rather than adjust the thresholds.

Once the computer has performed its automatic baselining and threshold adjustment, the normal monitoring mode begins. In the normal monitoring mode, the platform management subsystem intermittently measures the parameter with the sensor at step 108, and compares the measurement to the thresholds at step 110. If the sensor readings exceed the upper threshold, or fall below the lower threshold, the microcontroller 22 generates an action such as logging the event in the system event log 42 in the non-volatile storage 26, make the event available as a volatile status or interrupt signal, generate an alert, or directly trigger a system management action such as resetting or powering off the computer system. The actions can be used by the platform management subsystem 20 (or other components of the computer system) to determine whether the computer system is operating abnormally.

More generally, the platform monitoring subsystem 20 can trigger an event any time the measured parameter crosses a threshold. For example, if the sensor readings falls below the upper threshold, or exceeds the lower threshold, this can be used to signal that the computer system is now operating normally. In addition, multiple types of thresholds can be stored for each parameter. For example, the platform management system may include "non-critical" thresholds as a warning, "critical" thresholds to indicate that specified operating ranges have been exceeded, and "non-recovery" thresholds to indicate that hardware may have been damaged.

It may be noted that the autobaselining and threshold adjustment process may be reexecuted, automatically or manually, e.g., in response to a configuration or environmental change. For example, if a new hard-drive is installed in the chassis, the autobaselining and threshold adjustment process may be reexecuted for the temperature sensor.

Although the invention has been described with sensors that monitor the "physical" parameters of the computer system, the invention might also apply to "performance" parameters, such as chip set, bus and interface performance monitors (e.g., memory errors, bus occupancy, bus error rate, bus backoff operation rate, cache hits, memory usage, communication error rate, and input/output speed). Copies of the initial thresholds can be maintained separately from the adjusted thresholds in the non-volatile memory, and the microcontroller can log additional events if the sensor readings exceed or fall below the initial thresholds.

The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

The present invention has been described in terms of a number of embodiments. The invention, however, is not limited to the embodiments depicted and described. Rather, the scope of the invention is defined by the appended claims.

What is claimed is:

1. A computer monitoring system, comprising:
a sensor to measure a parameter of a computer;
a non-volatile storage that stores a threshold representing a limit for the parameter, the threshold having an initial sensitivity level that is set during manufacturing of the computer to correspond to manufacturing specifications; and
a controller configured to tighten the sensitivity of the threshold during operation of the computer to a new sensitivity level that is higher than the initial sensitivity level.

2. The monitoring system of claim 1, wherein the sensor measures a physical parameter.

3. The monitoring system of claim 2, wherein the sensor measures a parameter selected from the group consisting of environmental, mechanical and electrical parameters.

4. The monitoring system of claim 2, wherein the sensor measures a parameter selected from the group consisting of temperature, fan speed, supply voltage, and supply current.

5. The monitoring system of claim 1, wherein the threshold includes an upper threshold that indicates a normal upper limit of the parameter and a lower threshold that indicates a normal lower limit of the parameter.

6. The monitoring system of claim 5, wherein the controller is configured to log an event in the non-volatile storage if the measurement taken by the sensor exceeds the upper threshold or falls below the lower threshold.

7. The monitoring system of claim 5, wherein the controller is configured to generate an action if the measurement taken by the sensor exceeds the upper threshold or falls below the lower threshold.

8. The monitoring system of claim 1, wherein the controller is configured to log an event in the non-volatile storage if the measurement taken by the sensor crosses the threshold.

9. The monitoring system of claim 1, wherein to tighten the sensitivity of the threshold includes to:
measure the parameter at a plurality of times during operation of the computer;
identify an extreme value from the plurality of measurements; and
set the threshold to be closer to the extreme value.

10. A method of monitoring a computer, the method comprising:
storing a threshold representing a limit for a parameter of the computer, the threshold having an initial sensitivity level that is set during manufacturing of the computer to correspond to manufacturing specifications; and
during operation of the computer, tightening the sensitivity of the threshold to a new sensitivity level that is higher than the initial sensitivity level.

11. The method of claim 10, wherein tightening the sensitivity of the threshold includes:
measuring the parameter at a plurality of times during operation of the computer;
identifying an extreme value from the plurality of measurements; and
setting the threshold to be closer to the extreme value.

12. The method of claim 10, wherein the parameter is selected from the group consisting of environmental, mechanical and electrical parameters.

13. The method of claim 10, wherein the parameter is selected from the group consisting of temperature, fan speed, supply voltage, and supply current.

14. The method of claim 10, wherein the threshold includes an upper threshold that indicates a normal upper limit of the parameter and a lower threshold that indicates a normal lower limit of the parameter.

15. The method of claim 14, further comprising measuring the parameter and logging an event if the measurement exceeds the upper threshold or falls below the lower threshold.

16. The method of claim 14, further comprising measuring the parameter and generating an action if the measurement exceeds the upper threshold or falls below the lower threshold.

17. The method of claim 10, further comprising measuring the parameter and logging an event if the measurement crosses the threshold.

* * * * *